July 23, 1957  W. SHOTEY  2,799,979
GRINDING WHEEL

Filed June 28, 1955  2 Sheets-Sheet 1

INVENTOR.
WILLIAM SHOTEY
ATTORNEYS

July 23, 1957 W. SHOTEY 2,799,979
GRINDING WHEEL
Filed June 28, 1955 2 Sheets-Sheet 2
FIG.5.
FIG.7.
FIG.8.
FIG.9.
FIG.6.
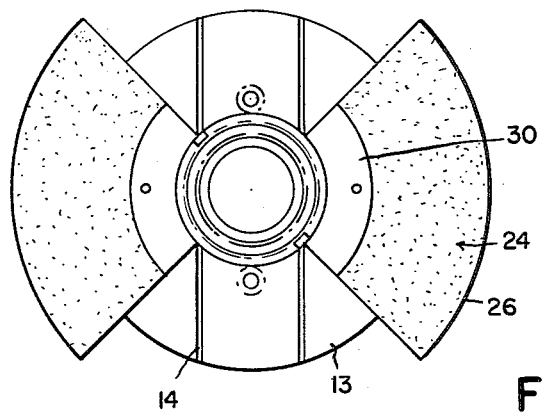
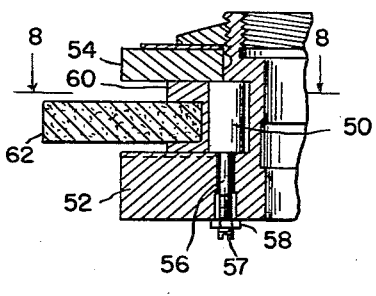
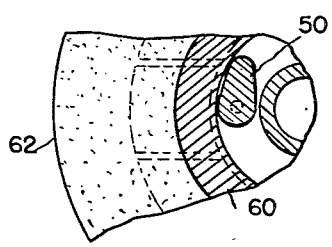
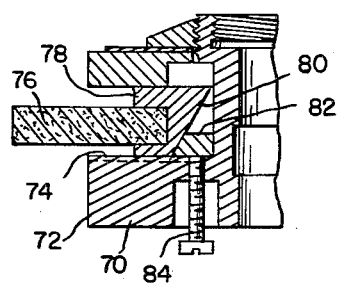
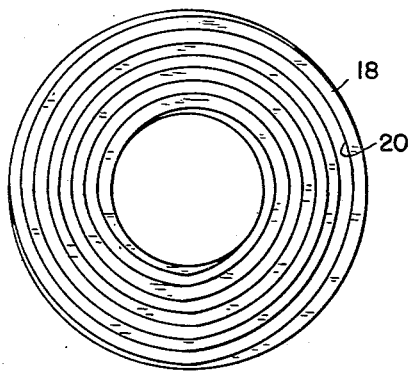
INVENTOR.
WILLIAM SHOTEY.
BY
ATTORNEYS

2,799,979
GRINDING WHEEL

William Shotey, Dearborn, Mich.

Application June 28, 1955, Serial No. 518,544

2 Claims. (Cl. 51—206.5)

The present invention relates to a grinding wheel, and more particularly, to an external grinding wheel adapted to be used as a form grinder for use in grinding helical parts, such for example as the helical teeth on gears.

As is well known, when a grinding wheel has its periphery formed to an involute and is used for grinding helical parts such as, for example, the teeth of a helical gear, the involute produced on the part differs from the involute form trimmed on the wheel. For any given diameter of wheel it is possible by trial and error, or computation, to produce an involute on the wheel which will produce the desired involute on the part. However, the diameter of the wheel enters into the proper shape of the involute on the wheel and accordingly, when the wheel is trimmed so that it is reduced in diameter, the involute required for the wheel of smaller diameter is different from the required involute on the wheel before trimming.

It is an object of the present invention to provide an involute form grinder capable of producing a desired involute on a work part throughout a plurality of trimmings.

More specifically, it is an object of the present invention to provide an involute form grinder composed of a plurality of sector-shaped segments, in combination with means for effecting generally radially outward adjustment of the segments so as to maintain a constant diameter of the grinding wheel throughout repeated trimmings.

It is a feature of the present invention to provide a grinding wheel of the character described including means for effecting equal simultaneous outward radial adjustment of a plurality of sector-shaped segments.

Other objects and features of the invention will become apparent as the description proceeds, especially when taken in conjunction with the accompanying drawings, wherein:

Figure 5 is a plan view of a partially assembled wheel;

Figure 6 is a bottom plan view of the spiral adjusting plate;

Figure 7 is a fragmentary longitudinal section through a second embodiment of the present invention;

Figure 8 is a fragmentary section on the line 8—8 in Figure 7; and

Figure 9 is a fragmentary longitudinal section through yet another embodiment of the present invention.

Figure 1:
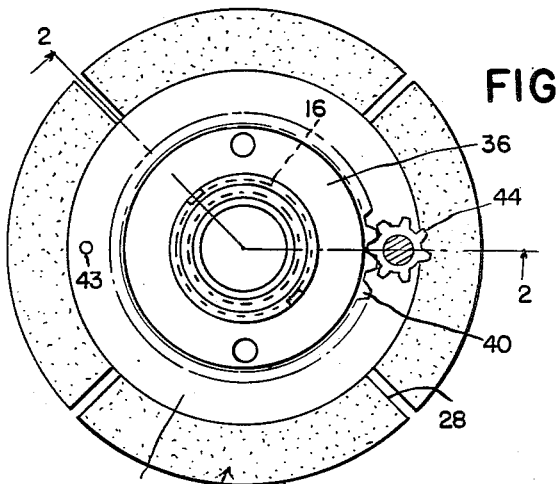
Figure 1 is an end view of a grinding wheel constructed in accordance with the present invention.
Figure 2:
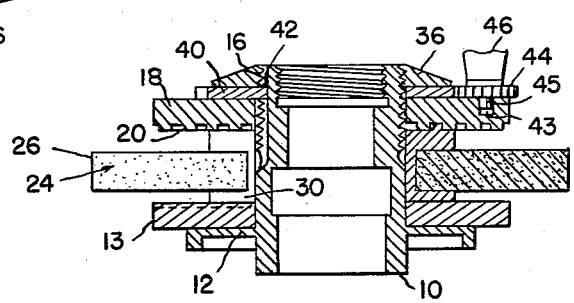
Figure 2 is a section on the line 2—2 in Figure 1.
Figure 3:
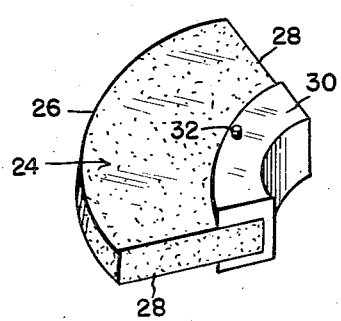
Figure 3 is a perspective view showing one side of a wheel segment.
Figure 4:
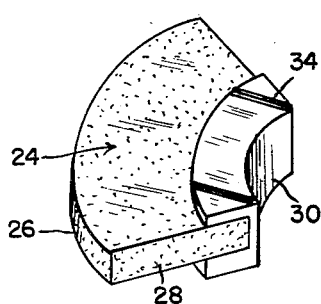
Figure 4 is a perspective view showing the opposite side of the wheel segment.

Referring now to Figures 1 to 6, the grinding wheel comprises an adaptor 10 designed to be connected to the spindle of a grinder. Extending radially outwardly from the adaptor 10 is a flange 12 to which is fixed a generally annular guide plate 13. The guide plate 13 may, if desired, be integral with the adaptor 10. The guide plate 13, as best seen in Figure 5, is provided with a plurality of sets of generally radially-extending trackways 14. These trackways may be constituted by grooves or upstanding ribs, as will be readily apparent.

The outer end of the adaptor 10 is threaded as indicated at 16. An adjusting plate 18 is carried by the outer end of the adaptor 10 and is rotatable thereon. The under surface of the adjustment plate 18 is provided with a spiral trackway 20, as best seen in Figure 6.

Intermediate the guide plate 13 and the adjustment plate 18 there are mounted a plurality of generally sector-shaped grinding wheel segments 24, each of which comprises a segment of a complete grinding wheel having an outer circular edge 26 and straight ends 28, the ends 28 being substantially radial of the array of segments when assembled into a circular grinding wheel. The grinding wheel segments 24 are individually supported in generally sector-shaped holders 30 which are of generally U-shaped cross-section and which at one side are provided with adjustment elements 32 adapted to cooperate with the spiral trackway 20 and which at the opposite side are provided with guide elements 34 adapted to cooperate with the radial trackways 14.

The assembly may be completed with a fastening nut 36 threaded to the end of the adaptor 10 with an intervening washer or the like. However, in the embodiment of the invention illustrated in Figures 1 to 6 means is provided at this point for effecting simultaneous equal generally radial outward adjustment of the segments 24. This means comprises a relatively thin external gear 40 which is keyed or otherwise retained against rotation relative to the adaptor 10, as indicated at 42. The adjustment plate 18, which is rotatable relative to the adaptor 10 has a pair of opposed pilot openings 43 for the reception of the pilot nose 45 of an adjusting tool carrying a pinion 44 adapted to mesh with the gear 40. Two openings 43 are provided to balance the wheel. With the parts in the position illustrated in Figure 2, it will be apparent that rotation of the pinion 44 causes the pinion to roll around the periphery of the fixed gear 40 and hence results in rotation of the adjustment plate 18. Due to the spiral arrangement of the trackway 20, rotation of the adjustment plate 18 will result in radial adjustment of the grinding wheel segments 24, these segments being retained in properly oriented position and guided in their radial movement by cooperation between the guide elements 34 and the trackway 14.

It is contemplated that the nut 36 will be tightened down sufficiently tight to hold the parts in proper operating relation without at the same time preventing adjustment by rotation of the pinion 44. In other words, it will not be necessary to loosen one nut 36 in order to effect adjustment of the segments.

No effort has been made to illustrate the involute shape normally provided at the periphery of the grinding wheel but this may be accomplished by any suitable means. One of the great advantages of the present invention is that a master profile, once arrived at, may be used for effecting suitable trimming operations of the wheel. For this purpose, after the wheel has reached a condition in which it requires trimming, the pinion 44 will be rotated an amount sufficient to provide the necessary stock for trimming. The trimmer may be located in a stationary position and will produce the desired form on the grinding wheel at a constant operating diameter. This operation may be repeated over and over until the grinding wheel is used up.

While in the preferred embodiment so far described, means is provided for effecting simultaneous and equal adjustment of all of the wheel segments, it is within the scope of the present invention to provide independent means for effecting radial adjustment of the several wheel segments. Thus, referring to Figures 7 and 8, there is illustrated an arrangement which differs from the embodiment illustrated in Figure 2 primarily in that a cam 50 is provided intermediate the guide plates 52 and the opposing plate 54. In this case, the plate 54 is of course not provided with the spiral trackway previously described. The cam 50 has an operating stem 56 formed thereon terminating in a slotted end 57 and provided with a lock nut 58. The cam 50 engages the inner surface of the U-shaped wheel supporting element 60. As will be obvious, adjustment of the cam will move the wheel segment 62 radially outwardly.

In Figure 9 there is illustrated another embodiment of the invention. In this case, the adaptor 70 has an integrally formed guide plate 72 provided with a trackway 74. The grinding wheel segments 76 are independently radially adjustable and are mounted in segment supports 78 which in this instance have their inner surfaces inclined as indicated at 80 to form camming surfaces. Camming blocks 82 are provided which are movable axially of the assembly as by means of an adjusting screw 84. Axial adjustment of the camming blocks 82 upwardly as seen in Figure 9, results in outward camming of the wheel segment 76 as will be readily apparent.

While the invention has been disclosed primarily as useful in connection with involute form grinding, it may also be employed in an external grinding wheel carrying out generating operations where a side of the wheel is employed as the generating surface and where the side of the wheel is inclined or non-perpendicular to the axis of rotation. Thus, for example, the generating surface of the wheel may be a conical surface.

In Figure 1 the segments are shown as initially spaced circumferentially. This is a matter of choice, and the ends of the segments may, if desired, be in abutment. However, when spaced apart in initial position, the spaces perform the function of the notches commonly provided in grinding wheels. If the ends of the segments abut in initial position, the segments may be notched, if desired, in accordance with the usual practice.

What I claim is:

1. A grinding wheel comprising a hub, a first disc mounted on said hub and having a plurality of rectilinear guideways thereon disposed in generally radial directions, a second disc rotatably mounted on said hub in axially-spaced relationship to said first disc and having a spiral trackway thereon, a plurality of grinding wheel segment holders mounted between said discs with parallel opposite sides slidably engaging said discs, a generally sector-shaped grinding wheel segment mounted in each holder, said sides adjacent said first disc having guideway-following portions guidedly engaging said guideways, said sides adjacent said second disc having trackway-following portions operatively engaging said trackway, means for urging said discs and holders into snug but relatively sliding engagement with one another, and means for rotating said second disc relatively to said first disc whereby to move said holders and grinding wheel segments radially inward and outward along said guideways while providing relatively-sliding guidance thereon on opposite sides thereof.

2. A grinding wheel segment unit for a multi-part segmental grinding wheel, said unit comprising a grinding wheel segment holder of generally arcuate channel shape havin therein an outwardly-facing substantially arcuate channel with substantially parallel side walls and an arcuate bottom wall extending between said side walls, one of said side walls having a plurality of spaced elongated substantially parallel guideways thereon extending outwardly from said bottom wall, one of said side walls having a projection thereon extending axially therefrom, and a generally sector-shaped grinding wheel segment of abrasive material secured in said channel of said holder and having coaxial outer and inner arcuate surfaces, said inner surface being seated against said arcuate bottom wall of said channel.

References Cited in the file of this patent
UNITED STATES PATENTS

| | | |
|---|---|---|
| 1,511,165 | Jaeger | Oct. 7, 1924 |
| 1,697,505 | Hyde | Jan. 1, 1929 |
| 2,258,510 | Laessker | Oct. 7, 1941 |